(12) United States Patent
Litvak et al.

(10) Patent No.: US 12,447,342 B2
(45) Date of Patent: *Oct. 21, 2025

(54) USE OF ONE OR MORE EVOKED RESPONSE SIGNALS TO DETERMINE AN INSERTION STATE OF AN ELECTRODE LEAD DURING AN ELECTRODE LEAD INSERTION PROCEDURE

(71) Applicant: Advanced Bionics AG, Staefa (CH)

(72) Inventors: Leonid M. Litvak, Los Angeles, CA (US); Kanthaiah Koka, Valencia, CA (US)

(73) Assignee: Advanced Bionics AG, Staefa (CH)

( * ) Notice: Subject to any disclaimer, the term of this patent is extended or adjusted under 35 U.S.C. 154(b) by 747 days.

This patent is subject to a terminal disclaimer.

(21) Appl. No.: 17/620,027

(22) PCT Filed: Apr. 30, 2020

(86) PCT No.: PCT/US2020/030834
§ 371 (c)(1),
(2) Date: Dec. 16, 2021

(87) PCT Pub. No.: WO2021/006943
PCT Pub. Date: Jan. 14, 2021

(65) Prior Publication Data
US 2022/0233861 A1 Jul. 28, 2022

Related U.S. Application Data

(63) Continuation-in-part of application No. PCT/US2019/041136, filed on Jul. 10, 2019.

(51) Int. Cl.
*A61N 1/36* (2006.01)
*A61N 1/02* (2006.01)
(Continued)

(52) U.S. Cl.
CPC ......... *A61N 1/36039* (2017.08); *A61N 1/025* (2013.01); *A61N 1/0541* (2013.01); *A61N 1/08* (2013.01); *A61N 1/36171* (2013.01)

(58) Field of Classification Search
CPC .. A61N 1/025; A61N 1/0541; A61N 1/36039; A61N 1/36171
See application file for complete search history.

(56) References Cited

U.S. PATENT DOCUMENTS

| 2013/0006328 A1 | 1/2013 | Bouchataoui et al. |
| 2015/0320550 A1 | 11/2015 | Downing et al. |

(Continued)

FOREIGN PATENT DOCUMENTS

| CN | 107371113 A | 11/2017 |
| CN | 107847739 A | 3/2018 |

(Continued)

OTHER PUBLICATIONS

"International Search Report and Written Opinion received in International Application No. PCT/US20/30834."

(Continued)

*Primary Examiner* — Joseph M Dietrich
(74) *Attorney, Agent, or Firm* — ALG Intellectual Property, LLC

(57) ABSTRACT

An exemplary diagnostic system is configured to direct an acoustic stimulation generator to an acoustic stimulation generator to apply acoustic stimulation having a plurality of stimulus frequencies to a recipient of a cochlear implant during an insertion procedure in which an electrode lead communicatively coupled to the cochlear implant is inserted into a cochlea of the recipient, direct the cochlear implant to use an electrode disposed on the electrode lead to record a plurality of evoked response signals during the insertion procedure, each evoked response signal included in the (Continued)

plurality of evoked response signals corresponding to a different stimulus frequency included in the plurality of stimulus frequencies, and determine, based on an amplitude and a phase of each of one or more evoked response signals included in the plurality of evoked response signals, an insertion state of the electrode lead within the cochlea of the recipient.

20 Claims, 14 Drawing Sheets

(51) Int. Cl.
*A61N 1/05* (2006.01)
*A61N 1/08* (2006.01)

(56) References Cited

U.S. PATENT DOCUMENTS

2019/0030323 A1   1/2019   Koka
2019/0045680 A1   2/2019   Kondo

FOREIGN PATENT DOCUMENTS

| CN | 108601937 A | 9/2018 |
|---|---|---|
| WO | 2017065809 | 4/2017 |
| WO | 2019045680 | 3/2019 |
| WO | 2019045747 | 3/2019 |

OTHER PUBLICATIONS

"International Search Report and Written Opinion received in International Application No. PCT/US2019/041136."

Greenwood, DD et al., "A cochlear frequency-position function for several species—29 years later", Journal of the Acoustical Society of America, vol. 87 ,1990, 2592-2605.

Greenwood, et al., "Critical bandwidth and the frequency coordinates of the basilar membrane", J. Acoust. Soc. Am. 33, 1344-1356, 1961.

Kohllöffel, et al., "Longitudinal Amplitude and Phase Distribution of the Cochlear Microphonic (Guinea Pig) and Spatial Filtering", Journal of Sound and Vibration, vol. 11, Issue 3, Mar. 1970, pp. 325-334.

Riggs, et al., "Intra-Cochlear Electrocochleography During Cochear Implant Electrode Insertion Is Predictive of Final Scalar Location", Otology & Neurotology, vol. 39, No. 8, 2018 (7), 654-659.

Stakhovskaya, et al., "Frequency map for the human cochlear spiral ganglion: Implications for cochlear implants", JARO—Journal of the Association for Research in Otolaryngology, 8(2), 220-233.

USE OF ONE OR MORE EVOKED RESPONSE SIGNALS TO DETERMINE AN INSERTION STATE OF AN ELECTRODE LEAD DURING AN ELECTRODE LEAD INSERTION PROCEDURE

RELATED APPLICATIONS

The present application claims priority to PCT International Application No. PCT/US2019/041136, filed Jul. 10, 2019, the contents of which are hereby incorporated by reference in their entirety.

BACKGROUND INFORMATION

During an insertion procedure in which an electrode lead is placed within the cochlea, it may be desirable to ascertain an insertion state of the electrode lead. For example, it may be desirable to determine and convey in real-time to a surgeon performing the insertion procedure when an electrode on the electrode lead passes a particular characteristic frequency location within the cochlea, when an electrode on the electrode lead is within a vicinity of a cluster of hair cells, and/or when the electrode lead is possibly causing trauma to a structure of the cochlea.

BRIEF DESCRIPTION OF THE DRA NGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
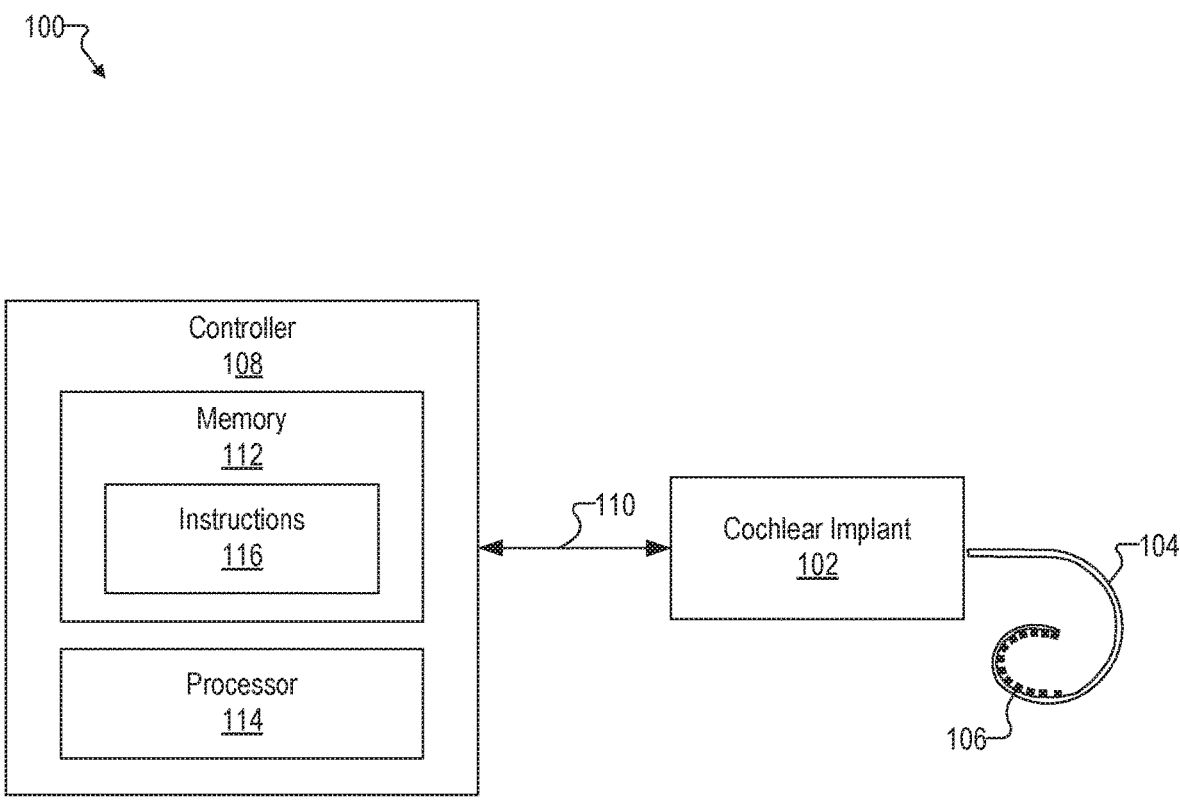
FIG. 1 illustrates an exemplary cochlear implant system according to principles described herein.

Systems and methods for use of one or more evoked response signals to determine an insertion state of an electrode lead during an electrode lead insertion procedure are described herein. For example, a diagnostic system may direct an acoustic stimulation generator to apply acoustic stimulation having a plurality of stimulus frequencies to a recipient of a cochlear implant during an insertion procedure in which an electrode lead communicatively coupled to the cochlear implant is inserted into a cochlea of the recipient. The diagnostic system may direct the cochlear implant to use an electrode disposed on the electrode lead to record a plurality of evoked response signals during the insertion procedure. Each evoked response signal included in the plurality of evoked response signals may correspond to a different stimulus frequency included in the plurality of stimulus frequencies and may be representative of evoked responses that occur within the recipient in response to the acoustic stimulation applied to the recipient. The evoked responses may each be an electrocochleographic ("ECoG") potential (e.g., a cochlear microphonic potential, an action potential, a summating potential, etc.), an auditory nerve response, a brainstem response, a compound action potential, a stapedius reflex, and/or any other type of neural or physiological response that may occur within a recipient in response to application of acoustic stimulation to the recipient. Evoked responses may originate from neural tissues, hair cell to neural synapses, inner or outer hair cells, or other sources.

As will be described herein, attributes associated with the evoked response signals recorded by the electrode may be indicative of an insertion state of the electrode lead within the cochlea of the recipient. For example, an amplitude and/or a phase of one or more evoked response signals may be indicative of a particular insertion state. As used herein, "an insertion state" may correspond to any of a plurality of different insertion states that may be associated with insertion of the electrode lead into the cochlea of the recipient. For example, one or more insertion states may be associated with passing a characteristic frequency location of the cochlea, passing a cluster of hair cells or neurons, contacting a structure of the cochlea (e.g., the basilar membrane), causing trauma to the cochlea (e.g., passing through the basilar membrane), etc. Accordingly, the diagnostic system may determine an insertion state of the electrode lead within the cochlea of the recipient based on an amplitude and a phase of each of one or more evoked response signals included in the plurality of evoked response signals.

By using acoustic stimulation having a plurality of stimulus frequencies to facilitate determining an insertion state, the systems and methods described herein may optimize determination of an insertion state and/or facilitate determination of additional or alternative insertion states as compared to conventional methods. In addition, the systems and methods described herein may be used to provide real time feedback to a user (e,g., a surgeon) performing an insertion procedure to ensure proper placement of an electrode lead within a cochlea of a recipient. These and other benefits and advantages of the systems and methods described herein will be made apparent herein.

FIG. 1 illustrates an exemplary cochlear implant system 100 configured to be used by a recipient. As shown, cochlear implant system 100 includes a cochlear implant 102, an electrode lead 104 physically coupled to cochlear implant 102 and having an array of electrodes 106, and a controller 108 configured to be communicatively coupled to cochlear implant 102 by way of a communication link 110.

The cochlear implant system 100 shown in FIG. 1 is unilateral (i.e., associated with only one ear of the recipient). Alternatively, a bilateral configuration of cochlear implant system 100 may include separate cochlear implants and electrode leads for each ear of the recipient. In the bilateral configuration, controller 108 may be implemented by a single controller configured to interface with both cochlear implants or by two separate controllers each configured to interface with a different one of the cochlear implants.

Cochlear implant 102 may be implemented by any suitable type of implantable stimulator, For example, cochlear implant 102 may be implemented by an implantable cochlear stimulator. Additionally or alternatively, cochlear implant 102 may be implemented by a brainstem implant and/or any other type of device that may be implanted within the recipient and configured to apply electrical stimulation to one or more stimulation sites located along an auditory pathway of the recipient.

In some examples, cochlear implant 102 may be configured to generate electrical stimulation representative of an audio signal processed by controller 108 in accordance with one or more stimulation parameters transmitted to cochlear implant 102 by controller 108. Cochlear implant 102 may be further configured to apply the electrical stimulation to one or more stimulation sites (e.g., one or more intracochlear locations) within the recipient by way of one or more electrodes 106 on electrode lead 104. In some examples, cochlear implant 102 may include a plurality of independent current sources each associated with a channel defined by one or more of electrodes 106. In this manner, different stimulation current levels may be applied to multiple stimulation sites simultaneously by way of multiple electrodes 106.

Cochlear implant 102 may additionally or alternatively be configured to generate, store, and/or transmit data. For example, cochlear implant may use one or more electrodes 106 to record one or more signals (e.g., one or more voltages, impedances, evoked responses within the recipient, and/or other measurements) and transmit, by way of communication link 110, data representative of the one or more signals to controller 108. In some examples, this data is referred to as back telemetry data.

Electrode lead 104 may be implemented in any suitable manner. For example, a distal portion of electrode lead 104 may be pre-curved such that electrode lead 104 conforms with the helical shape of the cochlea after being implanted. Electrode lead 104 may alternatively be naturally straight or of any other suitable configuration.

In some examples, electrode lead 104 includes a plurality of wires (e.g., within an outer sheath) that conductively couple electrodes 106 to one or more current sources within cochlear implant 102. For example, if there are n electrodes 106 on electrode lead 104 and n current sources within cochlear implant 102, there may be n separate wires within electrode lead 104 that are configured to conductively connect each electrode 106 to a different one of the n current sources. Exemplary values for n are 8, 12, 16, or any other suitable number.

Electrodes 106 are located on at least a distal portion of electrode lead 104. In this configuration, after the distal portion of electrode lead 104 is inserted into the cochlea, electrical stimulation may be applied by way of one or more of electrodes 106 to one or more intracochlear locations. One or more other electrodes (e.g., including a ground electrode, not explicitly shown) may also be disposed on other parts of electrode lead 104 (e.g., on a proximal portion of electrode lead 104) to, for example, provide a current return path for stimulation current applied by electrodes 106 and to remain external to the cochlea after the distal portion of electrode lead 104 is inserted into the cochlea. Additionally or alternatively, a housing of cochlear implant 102 may serve as a ground electrode for stimulation current applied by electrodes 106.

Controller 108 may be configured to interface with (e.g., control and/or receive data from) cochlear implant 102. For example, controller 108 may transmit commands (e.g., stimulation parameters and/or other types of operating parameters in the form of data words included in a forward telemetry sequence) to cochlear implant 102 by way of communication link 110. Controller 108 may additionally or alternatively provide operating power to cochlear implant 102 by transmitting one or more power signals to cochlear implant 102 by way of communication link 110. Controller 108 may additionally or alternatively receive data from cochlear implant 102 by way of communication link 110. Communication link 110 may be implemented by any suitable number of wired and/or wireless bidirectional and/or unidirectional links.

As shown, controller 108 includes a memory 112 and a processor 114 configured to be selectively and communicatively coupled to one another. In some examples, memory 112 and processor 114 may be distributed between multiple devices and/or multiple locations as may serve a particular implementation.

Memory 112 may be implemented by any suitable non-transitory computer-readable medium and/or non-transitory processor-readable medium, such as any combination of non-volatile storage media and/or volatile storage media. Exemplary non-volatile storage media include, but are not limited to, read-only memory, flash memory, a solid-state drive, a magnetic storage device (e.g., a hard drive), ferroelectric random-access memory ("RAM"), and an optical disc. Exemplary volatile storage media include, but are not limited to, RAM (e.g., dynamic RAM).

Memory 112 may maintain (e.g., store) executable data used by processor 114 to perform one or more of the operations described herein. For example, memory 112 may store instructions 116 that may be executed by processor 114 to perform any of the operations described herein. Instructions 116 may be implemented by any suitable application, program (e.g., sound processing program), software, code, and/or other executable data instance. Memory 112 may also maintain any data received, generated, managed, used, and/or transmitted by processor 114.

Processor 114 may be configured to perform (e.g., execute instructions 116 stored in memory 112 to perform) various operations with respect to cochlear implant 102.

To illustrate, processor 114 may be configured to control an operation of cochlear implant 102. For example, processor 114 may receive an audio signal (e.g., by way of a microphone communicatively coupled to controller 108, a wireless interface (e.g., a Bluetooth interface), and/or a wired interface (e.g., an auxiliary input port)). Processor 114 may process the audio signal in accordance with a sound processing program (e.g., a sound processing program stored in memory 112) to generate appropriate stimulation parameters. Processor 114 may then transmit the stimulation parameters to cochlear implant 102 to direct cochlear implant 102 to apply electrical stimulation representative of the audio signal to the recipient.

In some implementations, processor 114 may also be configured to apply acoustic stimulation to the recipient. For example, a receiver (also referred to as a loudspeaker) may be optionally coupled to controller 108. In this configuration, processor 114 may deliver acoustic stimulation to the recipient by way of the receiver.

The acoustic stimulation may be representative of an audio signal (e.g., an amplified version of the audio signal), configured to elicit an evoked response within the recipient, and/or otherwise configured. In configurations in which processor 114 is configured to both deliver acoustic stimulation to the recipient and direct cochlear implant 102 to apply electrical stimulation to the recipient, cochlear implant system 100 may be referred to as a bimodal hearing system and/or any other suitable term.

Processor 114 may be additionally or alternatively configured to receive and process data generated by cochlear implant 102. For example, processor 114 may receive data representative of a signal recorded by cochlear implant 102 using one or more electrodes 106 and, based on the data, adjust one or more operating parameters of controller 108. Additionally or alternatively, processor 114 may use the data to perform one or more diagnostic operations with respect to cochlear implant 102 and/or the recipient.

Other operations may be performed by processor 114 as may serve a particular implementation. In the description provided herein, any references to operations performed by controller 108 and/or any implementation thereof may be understood to be performed by processor 114 based on instructions 116 stored in memory 112.

Figure 2:
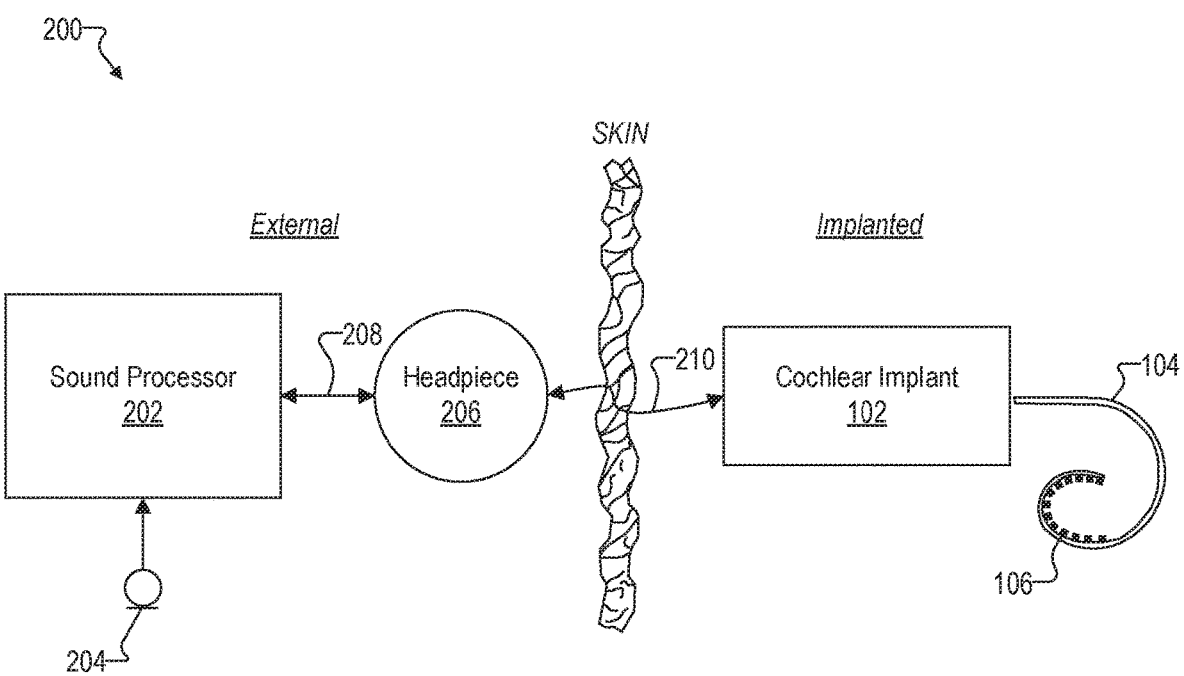
FIG. 2 illustrates an exemplary configuration of the cochlear implant system of FIG. 1.

Controller 108 may be implemented by one or more devices configured to interface with cochlear implant 102. To illustrate, FIG. 2 shows an exemplary configuration 200 of cochlear implant system 100 in which controller 108 is implemented by a sound processor 202 configured to be located external to the recipient. In configuration 200, sound processor 202 is communicatively coupled to a microphone 204 and to a headpiece 206 that are both configured to be located external to the recipient.

Sound processor 202 may be implemented by any suitable device that may be worn or carried by the recipient. For example, sound processor 202 may be implemented by a behind-the-ear ("BTE") unit configured to be worn behind and/or on top of an ear of the recipient. Additionally or alternatively, sound processor 202 may be implemented by an off-the-ear unit (also referred to as a body worn device) configured to be worn or carried by the recipient away from the ear. Additionally or alternatively, at least a portion of sound processor 202 is implemented by circuitry within headpiece 206.

Microphone 204 is configured to detect one or more audio signals (e,g., that include speech and/or any other type of sound) in an environment of the recipient. Microphone 204 may be implemented in any suitable manner, For example, microphone 204 may be implemented by a microphone that is configured to be placed within the concha of the ear near the entrance to the ear canal, such as a T-MIC™ microphone from Advanced Bionics. Such a microphone may be held within the concha of the ear near the entrance of the ear canal during normal operation by a boom or stalk that is attached to an ear hook configured to be selectively attached to sound processor 202. Additionally or alternatively, microphone 204 may be implemented by one or more microphones in or on headpiece 206, one or more microphones in or on a housing of sound processor 202, one or more beam-forming microphones, and/or any other suitable microphone as may serve a particular implementation.

Headpiece 206 may be selectively and communicatively coupled to sound processor 202 by way of a communication link 208 (e.g., a cable or any other suitable wired or wireless communication link), which may be implemented in any suitable manner. Headpiece 206 may include an external antenna (e.g., a coil and/or one or more wireless communication components) configured to facilitate selective wireless coupling of sound processor 202 to cochlear implant 102. Headpiece 206 may additionally or alternatively be used to selectively and wirelessly couple any other external device to cochlear implant 102. To this end, headpiece 206 may be configured to be affixed to the recipient's head and positioned such that the external antenna housed within headpiece 206 is communicatively coupled to a corresponding implantable antenna (which may also be implemented by a coil and/or one or more wireless communication components) included within or otherwise connected to cochlear implant 102. In this manner, stimulation parameters and/or power signals may be wirelessly and transcutaneously transmitted between sound processor 202 and cochlear implant 102 by way of a wireless communication link 210.

In configuration 200, sound processor 202 may receive an audio signal detected by microphone 204 by receiving a signal (e.g., an electrical signal) representative of the audio signal from microphone 204. Sound processor 202 may additionally or alternatively receive the audio signal by way of any other suitable interface as described herein. Sound processor 202 may process the audio signal in any of the ways described herein and transmit, by way of headpiece 206, stimulation parameters to cochlear implant 102 to direct cochlear implant 102 to apply electrical stimulation representative of the audio signal to the recipient.

In an alternative configuration, sound processor 202 may be implanted within the recipient instead of being located external to the recipient, In this alternative configuration, which may be referred to as a fully implantable configuration of cochlear implant system 100, sound processor 202 and cochlear implant 102 may be combined into a single device or implemented as separate devices configured to communicate one with another by way of a wired and/or wireless communication link. In a fully implantable implementation of cochlear implant system 100, headpiece 206 may not be included and microphone 204 may be implemented by one or more microphones implanted within the recipient, located within an ear canal of the recipient, and/or external to the recipient.

Figure 3:
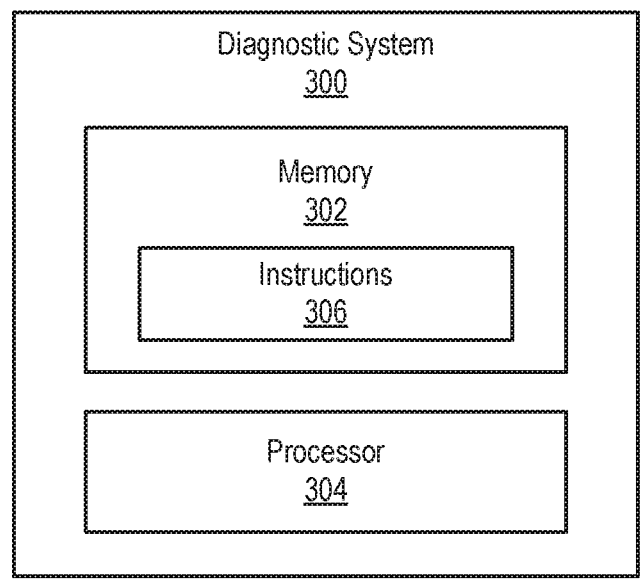
FIG. 3 illustrates an exemplary diagnostic system according to principles described herein.

FIG. 3 illustrates an exemplary diagnostic system 300 that may be configured to perform any of the operations described herein. As shown, diagnostic system 300 may include, without limitation, a storage facility 302 and a processing facility 304 selectively and communicatively coupled to one another. Facilities 302 and 304 may each include or be implemented by hardware and/or software components (e.g., processors, memories, communication interfaces, instructions stored in memory for execution by the processors, etc.). In some examples, facilities 302 and 304 may be distributed between multiple devices and/or multiple locations as may serve a particular implementation.

Storage facility 302 may maintain (e.g., store) executable data used by processing facility 304 to perform any of the operations described herein. For example, storage facility 302 may store instructions 306 that may be executed by processing facility 304 to perform any of the operations described herein. Instructions 306 may be implemented by any suitable application, software, code, and/or other executable data instance. Storage facility 302 may also maintain any data received, generated, managed, used, and/or transmitted by processing facility 304.

Processing facility 304 may be configured to perform (e.g., execute instructions 306 stored in storage facility 302 to perform) various operations. For example, processing facility 304 may direct an acoustic stimulation generator to apply acoustic stimulation having a plurality of stimulus frequencies to a recipient of a cochlear implant during an insertion procedure in which an electrode lead communicatively coupled to the cochlear implant is inserted into a cochlea of the recipient, direct the cochlear implant to use an electrode disposed on the electrode lead to record a plurality of evoked response signals during the insertion procedure, each evoked response signal included in the plurality of evoked response signals corresponding to a different stimulus frequency included in the plurality of stimulus frequencies and representative of evoked responses that occur within the recipient in response to the acoustic stimulation applied to the recipient, and determine, based on an amplitude and a phase of each of one or more evoked response signals included in the plurality of evoked response signals, an insertion state of the electrode lead within the cochlea of the recipient. These and other operations that may be performed by processing facility 304 are described in more detail herein.

Figure 4:
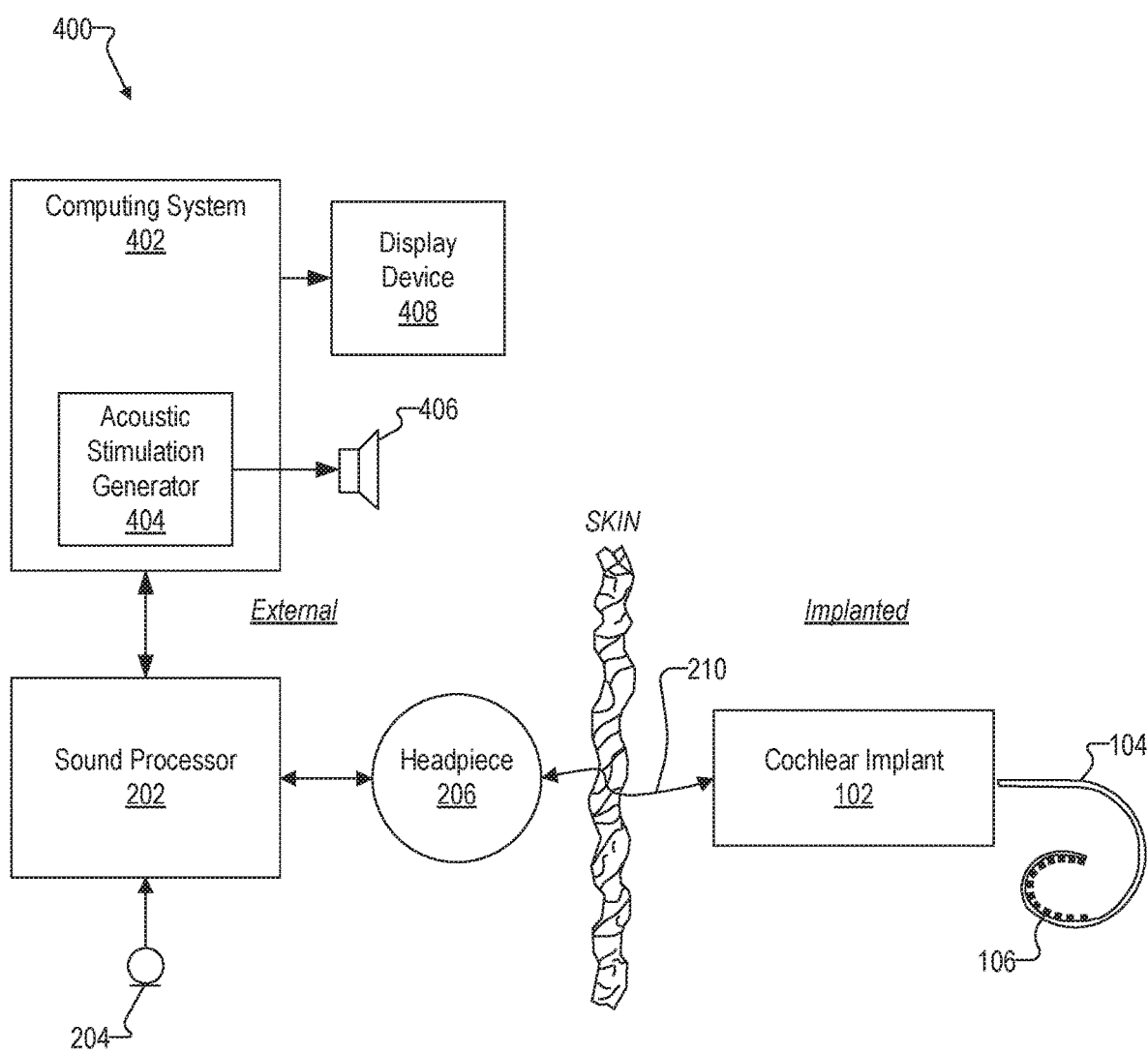
FIGS. 4-5 illustrate exemplary implementations of the diagnostic system of FIG. 3 according to principles described herein.

Diagnostic system 300 may be implemented in any suitable manner. For example, FIG. 4 shows an exemplary configuration 400 in which diagnostic system 300 is implemented by a computing system 402 configured to communicatively couple to sound processor 202. As shown, computing system 402 may include an acoustic stimulation generator 404 communicatively coupled to a speaker 406. Computing system 402 is also communicatively coupled to a display device 408, While computing system 402 is described herein as being be coupled to sound processor 202, computing system 402 may be alternatively coupled to any other implementation of controller 108 as may serve a particular implementation.

Computing system 402 may be implemented by any suitable combination of hardware (e.g., one or more computing devices) and software. For example, computing system 402 may be implemented by a computing device programmed to perform one or more fitting operations with respect to a recipient of a cochlear implant, To illustrate, computing system 402 may be implemented by a desktop computer, a mobile device (e.g., a laptop, a smartphone, a tablet computer, etc.), and/or any other suitable computing device as may serve a particular implementation. As an example, computing system 402 may be implemented by a mobile device configured to execute an application (e.g., a "mobile app") that may be used by a user (e.g., the recipient, a clinician, and/or any other user) to control one or more settings of sound processor 202 and/or cochlear implant 102 and/or perform one or more operations (e.g., diagnostic operations) with respect to data generated by sound processor 202 and/or cochlear implant 102.

Acoustic stimulation generator 404 may be implemented by any suitable combination of components configured to generate acoustic stimulation. In some examples, the acoustic stimulation may include one or more tones having one or more stimulus frequencies. Additionally or alternatively, the acoustic stimulation may include any other type of acoustic content that has at least a particular stimulus frequency of interest. Speaker 406 may be configured to deliver the acoustic stimulation generated by acoustic stimulation generator 404 to the recipient. For example, speaker 406 may be implemented by an ear mold configured to be placed in or near an entrance to an ear canal of the recipient.

Display device 408 may be implemented by any suitable device configured to display graphical content generated by computing system 402. For example, display device 408 may display one or more graphs of evoked responses recorded by an electrode disposed on electrode lead 104. Display device 408 is shown in FIG. 4 as an external device configured to display content generated by computing system 402. Additionally or alternatively, computing system 402 may include display device 408 as an integrated display in certain implementations.

Figure 5:
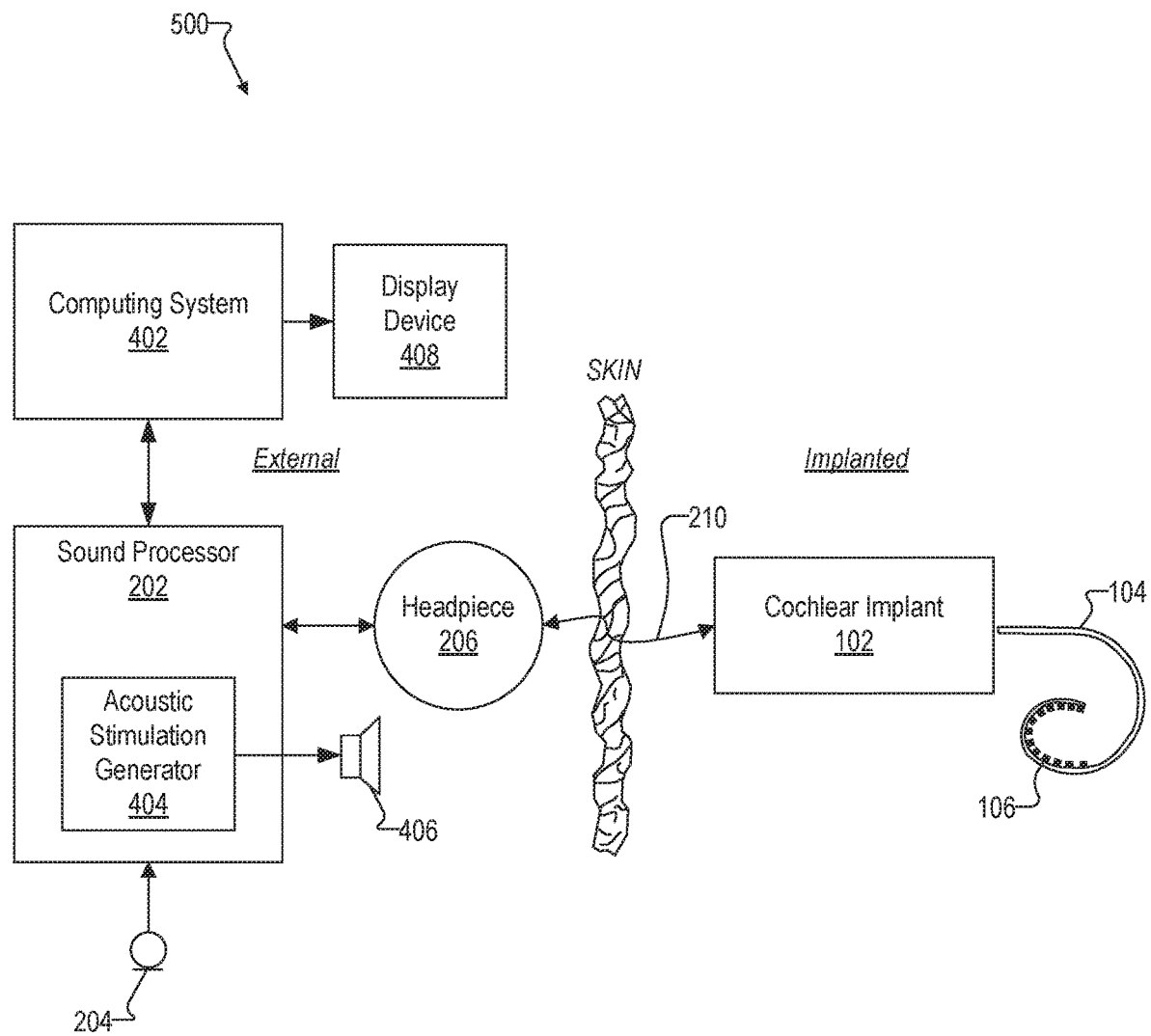

FIG. 5 shows another exemplary configuration 500 in which diagnostic system 400 is implemented by computing system 402. In configuration 500, acoustic stimulation generator 404 is included in sound processor 202. For example, sound processor 202 may be implemented by a bimodal sound processor (i.e., a sound processor configured to direct cochlear implant 102 to apply electrical stimulation to a recipient and acoustic stimulation generator 404 to apply acoustic stimulation to the recipient). In some examples, speaker 406 may be implemented by an audio ear hook that connects to sound processor 202.

FIGS. 6A-6F illustrate an exemplary insertion procedure in which an electrode lead 600 is inserted into a cochlea 602 of a recipient. For illustrative purposes, cochlea 602 is depicted in FIGS. 6A-6F as being "unrolled" instead of its actual curved, spiral shape. Electrode lead 600 may be similar to electrode lead 104 and may include a plurality of electrodes (e.g., electrodes 604-1 through electrode 604-16) disposed thereon. Electrode 604-1 is a distal-most electrode on electrode lead 600 and electrode 604-16 is a proximal-most electrode on electrode lead 600.

Various characteristic frequency locations within cochlea 602 are depicted by vertical dashed lines in each of FIGS. 6A-6F. As shown, a first characteristic frequency location is associated with 4 kHz. Hence, electrical stimulation applied by an electrode positioned at this characteristic frequency location may result in the recipient perceiving sound having 4 kHz or the hair cell and neural structures there respond to 4 kHz acoustic stimulus. FIGS. 6A-6F also depict characteristic frequency locations associated with 2 kHz, 1 kHz, 500 Hz, and 250 Hz. As shown, the frequencies associated with the characteristic frequency locations are tonotopically arranged, with relatively higher frequencies being located towards the entrance (or base) of cochlea 602 and relatively lower frequencies being located towards the distal end (or apex) of cochlea 602.

Figure 6A:
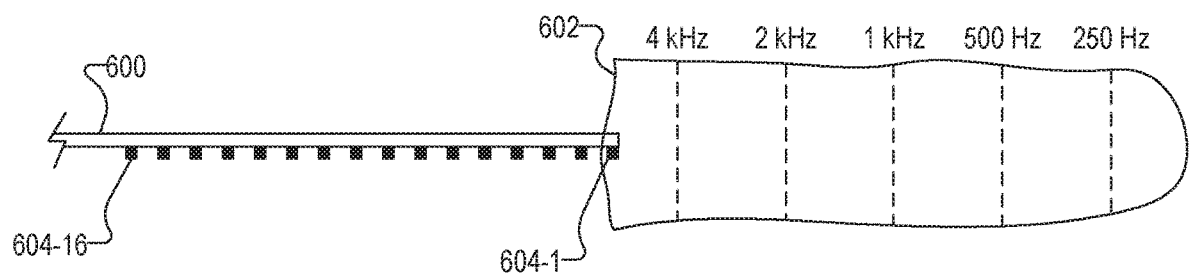
FIGS. 6A-6F illustrate an exemplary insertion procedure in which an electrode lead is inserted into a cochlea of a recipient according to principles described herein.
Figure 6B:
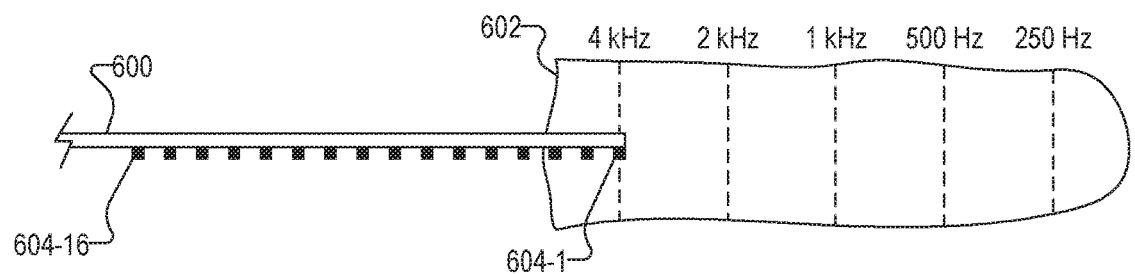
Figure 6C:
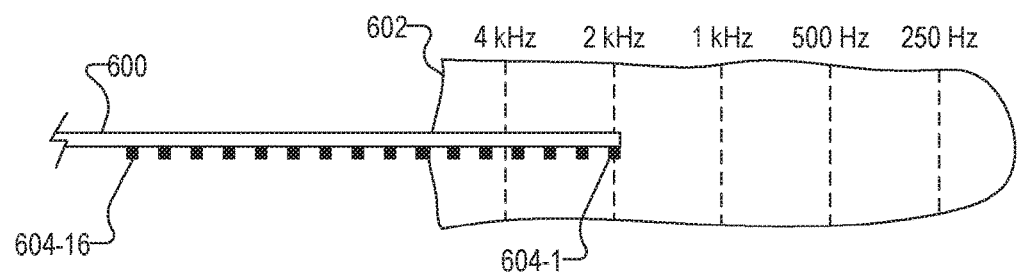
Figure 6D:
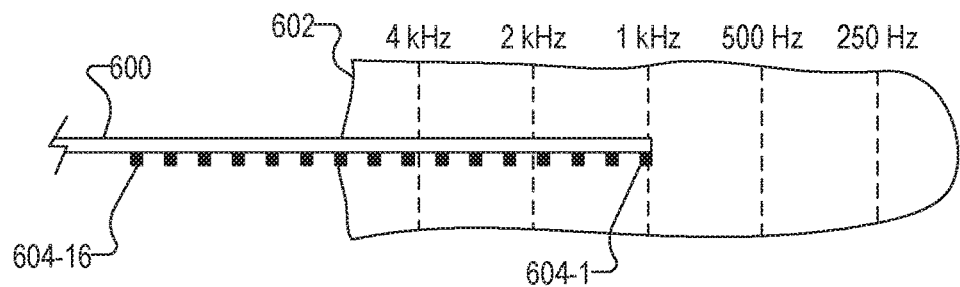
Figure 6E:
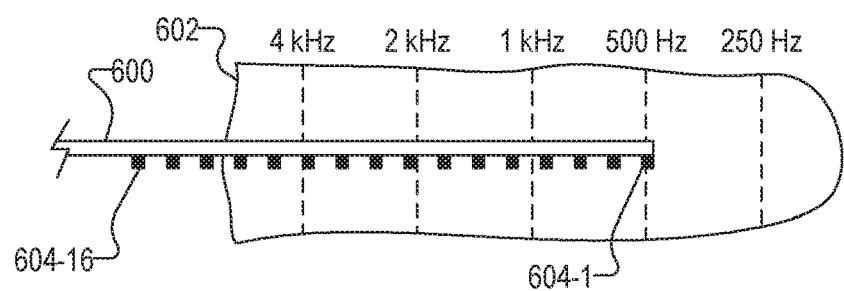

FIG. 6A shows electrode lead 600 entering cochlea 602. In this figure, electrode 604-1 is barely within cochlea 602. FIG. 6B shows electrode lead 600 after electrode lead 600 has been advanced further into cochlea 602 such that electrode 604-1 is positioned at the characteristic frequency location corresponding to 4 kHz.

Figure 6F:
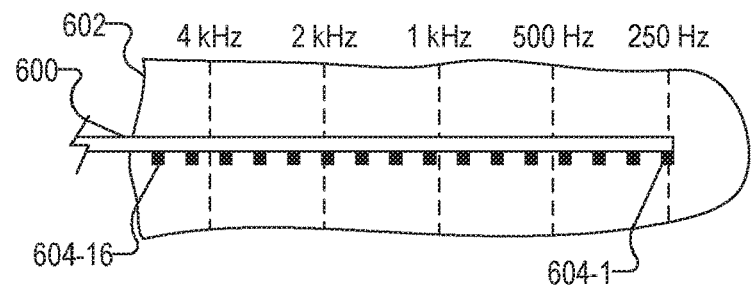

FIGS. 6C-6F show electrode lead 600 after electrode lead 600 has been advanced further into cochlea 602 such that electrode 604-1 is positioned at the characteristic frequency location corresponding to 2 kHz (FIG. 6C), then 1 kHz (FIG. 6D), then 500 Hz (FIG. 6E), and then 250 Hz (FIG. 6F).

As mentioned, it is desirable to monitor an insertion state of an electrode lead as the electrode lead is inserted within a cochlea to ensure that the electrode lead is inserted properly. To that end, diagnostic system 300 may direct an acoustic stimulation generator (e.g., acoustic stimulation generator 404) to apply acoustic stimulation having a plurality of stimulus frequencies (i.e., concurrently) to a recipient of a cochlear implant during an insertion procedure in which an electrode lead communicatively coupled to the cochlear implant is inserted into a cochlea of the recipient. Diagnostic system 300 may direct the acoustic stimulation generator to apply the acoustic stimulation having the plurality of stimulus frequencies in any suitable manner. For example, diagnostic system 300 may direct the acoustic stimulation generator to continuously apply the acoustic stimulation during an insertion procedure, intermittently apply the acoustic stimulation during the insertion procedure, simultaneously apply different stimulus frequencies of the acoustic stimulation during the insertion procedure, sequentially apply the different stimulus frequencies of the acoustic stimulation during the insertion procedure, or apply the acoustic stimulation in any other suitable manner as may serve a particular implementation.

The acoustic stimulation may have any suitable plurality of stimulus frequencies as may serve a particular implementation. In certain examples, the acoustic stimulation may have four different stimulus frequencies that are concurrently applied during an insertion procedure. For example, in certain implementations the acoustic stimulation may include a first stimulus frequency corresponding to 2 kHz, a second stimulus frequency corresponding to 1 kHz, a third stimulus frequency corresponding to 500 Hz, and a fourth stimulus frequency corresponding to 250 Hz. In certain alternative implementations, the acoustic stimulation may have less than or more than four stimulus frequencies.

The acoustic stimulation is configured to produce a plurality of evoked responses during an insertion procedure that are useful in determining an insertion state. Accordingly, diagnostic system 300 may direct cochlear implant 102 to use an electrode to record a plurality of evoked response signals during an insertion procedure. Diagnostic system 300 may direct cochlear implant 102 to use any suitable electrode or combination of electrodes on an electrode lead to record the plurality of evoked response signals. For example, in certain implementations, diagnostic system 300 may direct the cochlear implant to use a distal-most electrode (e.g., electrode 604-1) to record the plurality of evoked response signals. Each evoked response signal included in the plurality of evoked response signals may correspond to a different stimulus frequency included in the plurality of stimulus frequencies. In addition, each evoked response signal included in the plurality of evoked response signals may be representative of evoked responses that occur within the recipient in response to the acoustic stimulation applied to the recipient.

In certain examples, the plurality of evoked response signals may be considered as being included as part of a single evoked response detected by diagnostic system 300 in response to the acoustic stimulation applied to the recipient.

Attributes of the plurality of evoked response signals may be indicative of an insertion state of the electrode lead as the electrode lead is inserted within the cochlea.

For example, as the electrode lead is inserted within the cochlea, an amplitude and/or a phase of one or more evoked response signals included in the plurality of evoked response signals may change in a manner that is indicative of a particular insertion state of the electrode lead. Accordingly, based on an amplitude and a phase of each of one or more evoked response signal included in the plurality of evoked response signals, diagnostic system 300 may determine an insertion state of the electrode lead within the cochlea of the recipient.

Diagnostic system 300 may determine any suitable number and/or type of insertion states as may serve a particular implementation. In certain examples, an insertion state may correspond to the electrode lead passing a particular characteristic frequency location within the cochlea. In such examples, diagnostic system 300 may determine that the electrode lead passes the particular characteristic frequency location when, within a predetermined amount of time, both an amplitude of a particular evoked response signal included in the plurality of evoked response signals decreases by at least an amplitude threshold amount and a phase of the particular evoked response signal changes by at least a phase threshold amount. The particular characteristic frequency location may correspond to a particular stimulus frequency that corresponds to the particular evoked response signal and that is included in the plurality of stimulus frequencies. Accordingly, diagnostic system 300 may determine an insertion state as passing a certain characteristic frequency location based on which evoked response signal has both a decrease in amplitude by at least an amplitude threshold amount and a phase change by at least a phase threshold amount.

Figure 7:
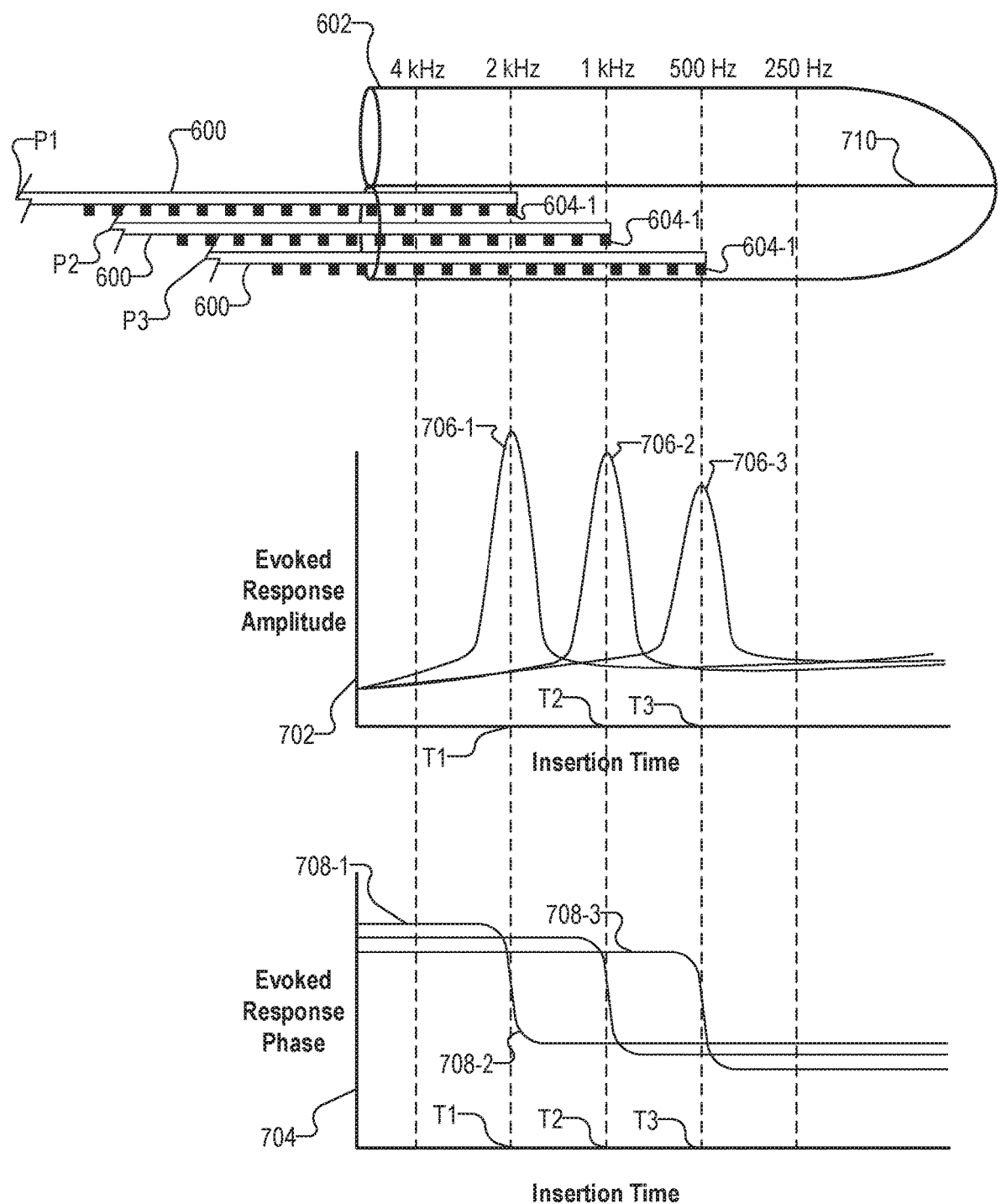
FIGS. 7-11 show exemplary graphs of evoked response signals that may be generated according to principles described herein.

To illustrate, FIG. 7 shows an exemplary lead insertion procedure in which electrode lead 600 is advanced into cochlea 602, Reference numbers P1 through P3 indicate positions of electrode lead 600. For example, at position P1, electrode lead 600 is at a first position in which electrode 604-1 is at the characteristic frequency location that corresponds to 2 kHz. At position P2, electrode lead 600 is at a second position in which electrode 604-1 is at the characteristic frequency location that corresponds to 1 kHz. At position P3, electrode lead 600 is at a third position in which electrode 604-1 is at the characteristic frequency location that corresponds to 500 Hz.

FIG. 7 also shows a graph 702 of amplitudes 706 (e.g., amplitudes 706-1 through 706-3) of evoked response signals recorded by electrode 604-1 at different insertion times T (e.g., T1 through T3) during the lead insertion procedure. In addition, FIG. 7 shows a graph 704 of phases 708 (e.g., phases 708-1 through 708-3) of the evoked response signals recorded by electrode 604-1 at different insertion times T during the lead insertion procedure. In this example, first, second, and third evoked response signals are generated in response to acoustic stimulation having stimulus frequencies of 2 kHz, 1 kHz, and 500 Hz, respectively. Hence, as shown in graph 702, as electrode lead 600 advances towards the characteristic frequency location that corresponds to 2 kHz, the amplitude 706-1 of a first evoked response signal, which is generated in response to acoustic stimulation having a stimulus frequencies of 2 kHz, increases and peaks at insertion time T1 when electrode lead 600 is positioned at position P1. As electrode lead 600 passes the characteristic frequency location that corresponds to 2 kHz, the first evoked response amplitude 706-1 decreases until it settles at a steady state value. As shown in graph 704, as electrode lead 600 advances towards the characteristic frequency location that corresponds to 2 kHz, the phase 708-1 of the first evoked response signal remains at a relatively high level. However, the phase 708-1 suddenly changes to a relatively low level at insertion time T1 as electrode lead 600 passes the characteristic frequency location that corresponds to 2 kHz.

As shown in FIG. 7, the decreasing of the first evoked response amplitude 706-1 and the changing of the phase 708-1 from the high level to the low level occur at substantially the same insertion time T1, and both occur as electrode 604-1 passes the characteristic frequency location that corresponds to 2 kHz. Hence, diagnostic system 300 may determine that electrode 604-1 passes the characteristic frequency location that corresponds to 2 kHz by detecting, within a predetermined time period, that both an amplitude 706-1 of the first evoked response signal recorded by electrode 604-1 decreases by at least an amplitude threshold amount and a phase 708-1 of the first evoked response signal recorded by electrode 604-1 changes by at least a phase threshold amount. The predetermined time period, the amplitude threshold amount, and/or the phase threshold amount may each be set by diagnostic system 300 to be any suitable value. For example, the predetermined time period may be set to be a relatively short time period (e.g., less than a few milliseconds) to ensure that the change in amplitude and in phase correspond to one another. In some examples, diagnostic system 300 may set the predetermined time period, the amplitude threshold amount, and/or the phase threshold in response to user input (e.g., by way of a graphical user interface). Additionally or alternatively, diagnostic system 300 may set the predetermined time period, the amplitude threshold amount, and/or the phase threshold automatically based on one or more factors, such as hearing loss, the stimulus frequency, recipient characteristics (e.g., age, gender, etc.), etc.

As is further shown in FIG. 7, after electrode lead 600 passes the characteristic frequency location that corresponds to 2 kHz, electrode lead 600 advances towards the characteristic frequency location that corresponds to 1 kHz. As electrode lead 600 advances toward the characteristic frequency location that corresponds to 1 kHz, the amplitude 706-2 of the second evoked response signal, which is generated in response to acoustic stimulation having a stimulus frequencies of 1 kHz, increases and peaks at insertion time T2 when electrode lead 600 is positioned at position P2. As electrode lead 600 passes the characteristic frequency location that corresponds to 1 kHz, the second evoked response amplitude 706-2 decreases until it settles at a steady state value. As shown in graph 704, as electrode lead 600 advances towards the characteristic frequency location that corresponds to 1 kHz, the phase 708-2 of the second evoked response signal remains at a relatively high level. However, the phase 708-2 suddenly changes to a relatively low level at insertion time T2 as electrode lead 600 passes the characteristic frequency location that corresponds to 1 kHz.

The decreasing of the second evoked response amplitude 706-2 and the changing of phase 708-2 from the high level to the low level in FIG. 7 occur at substantially the same insertion time T2, and both occur as electrode 604-1 passes the characteristic frequency location that corresponds to 1 kHz. Hence, diagnostic system 300 may determine that electrode 604-1 passes the characteristic frequency location that corresponds to 1 kHz by detecting, within an additional predetermined time period, that both an amplitude 706-2 of the second evoked response signal recorded by electrode 604-1 decreases by at least an amplitude threshold amount and a phase 708-2 of the second evoked response signal recorded by electrode 604-1 changes by at least a phase threshold amount. The additional predetermined time period, the amplitude threshold amount, and/or the phase threshold amount may each be set by diagnostic system 300 to be any suitable value, such as described herein.

As is further shown in FIG. 7, after electrode lead 600 passes the characteristic frequency location that corresponds to 1 kHz, electrode lead 600 advances towards the characteristic frequency location that corresponds to 500 Hz. As electrode lead 600 advances toward the characteristic frequency location that corresponds to 500 Hz, the amplitude 706-3 of the third evoked response signal, which is generated in response to acoustic stimulation having a stimulus frequencies of 500 Hz, increases and peaks at insertion time T3 when electrode lead 600 is positioned at position P3. As electrode lead 600 passes the characteristic frequency location that corresponds to 500 Hz, the third evoked response amplitude 706-3 decreases until it settles at a steady state value. As shown in graph 704, as electrode lead 600 advances towards the characteristic frequency location that corresponds to 500 Hz, the phase 708-3 of the third evoked response signal remains at a relatively high level. However, the phase 708-3 suddenly changes to a relatively low level at insertion time T3 as electrode lead 600 passes the characteristic frequency location that corresponds to 500 Hz.

The decreasing of the third evoked response amplitude 706-3 and the changing of phase 708-3 from the high level to the low level in FIG. 7 occur at substantially the same insertion time T3, and both occur as electrode 604-1 passes the characteristic frequency location that corresponds to 500 Hz. Hence, diagnostic system 300 may determine that electrode 604-1 passes the characteristic frequency location that corresponds to 500 Hz by detecting, within an additional predetermined time period, that both an amplitude 706-3 of the third evoked response signal recorded by electrode 604-1 decreases by at least an amplitude threshold amount and a phase 708-3 of the third evoked response signal recorded by electrode 604-1 changes by at least a phase threshold amount. The additional predetermined time period, the amplitude threshold amount, and/or the phase threshold amount may each be set by diagnostic system 300 to be any suitable value, such as described herein.

In certain examples, diagnostic system 300 may perform similar operations such as those described herein to determine when electrode lead passes other characteristic frequency locations that correspond to other frequencies (e.g., 4 kHz, 250 Hz, etc.).

In certain examples, diagnostic system 300 may determine that electrode lead 600 passes a characteristic frequency based on at least one of an amplitude of an additional evoked response signal included in the plurality of evoked response signals not decreasing by at least the amplitude threshold amount and a phase of the additional evoked response signal not changing by at least the phase threshold amount. For example, diagnostic system 300 may determine that electrode lead 600 passes the characteristic frequency location that corresponds to 1 kHz based on amplitude 706-3 of the third evoked response signal not decreasing by an amplitude threshold amount and/or phase 708-3 not changing by at least a phase threshold amount at insertion time T2 in addition to amplitude 706-2 and phase 708-3 of the second evoked response signal changing by an amplitude threshold amount and a phase threshold amount at insertion time T2.

In FIG. 7, various aspects of electrode lead 600 and the illustrated anatomical features of the recipient are simplified for clarity of illustration. For instance, while cochlea 602 has been "unrolled" in FIG. 7, it will be understood that cochlea 602 has a curved, spiral-shaped structure and that electrode lead 600 curves to follow the spiral-shaped structure. Similarly, the anatomy of cochlea 602 omit many details and are not drawn to scale.

FIG. 7 does, however, illustrate at least one additional structure that may be associated with an insertion state that may be determined by diagnostic system 300. In particular, FIG. 7 also shows a basilar membrane 710 that extends along a length of cochlea 602. As electrode lead 600 is inserted along cochlea 602, electrode lead 600 may contact a structure of cochlea 602 such as basilar membrane 710. In such examples, diagnostic system 300 may determine that electrode lead 600 is in contact with the structure of cochlea 602 when amplitudes of at least two of the evoked response signals included in the plurality of evoked response signals have decreased by at least an amplitude threshold amount and phases of the at least two of the evoked response signals have changed by at least a phase threshold amount.

In certain alternative examples, diagnostic system 300 may determine that electrode lead 600 is in contact with the structure of cochlea 602 when amplitudes of each of the evoked response signals included in the plurality of evoked response signals have decreased by at least an amplitude threshold amount and phases of each of the evoked response signals have changed by at least a phase threshold amount.

Figure 8:
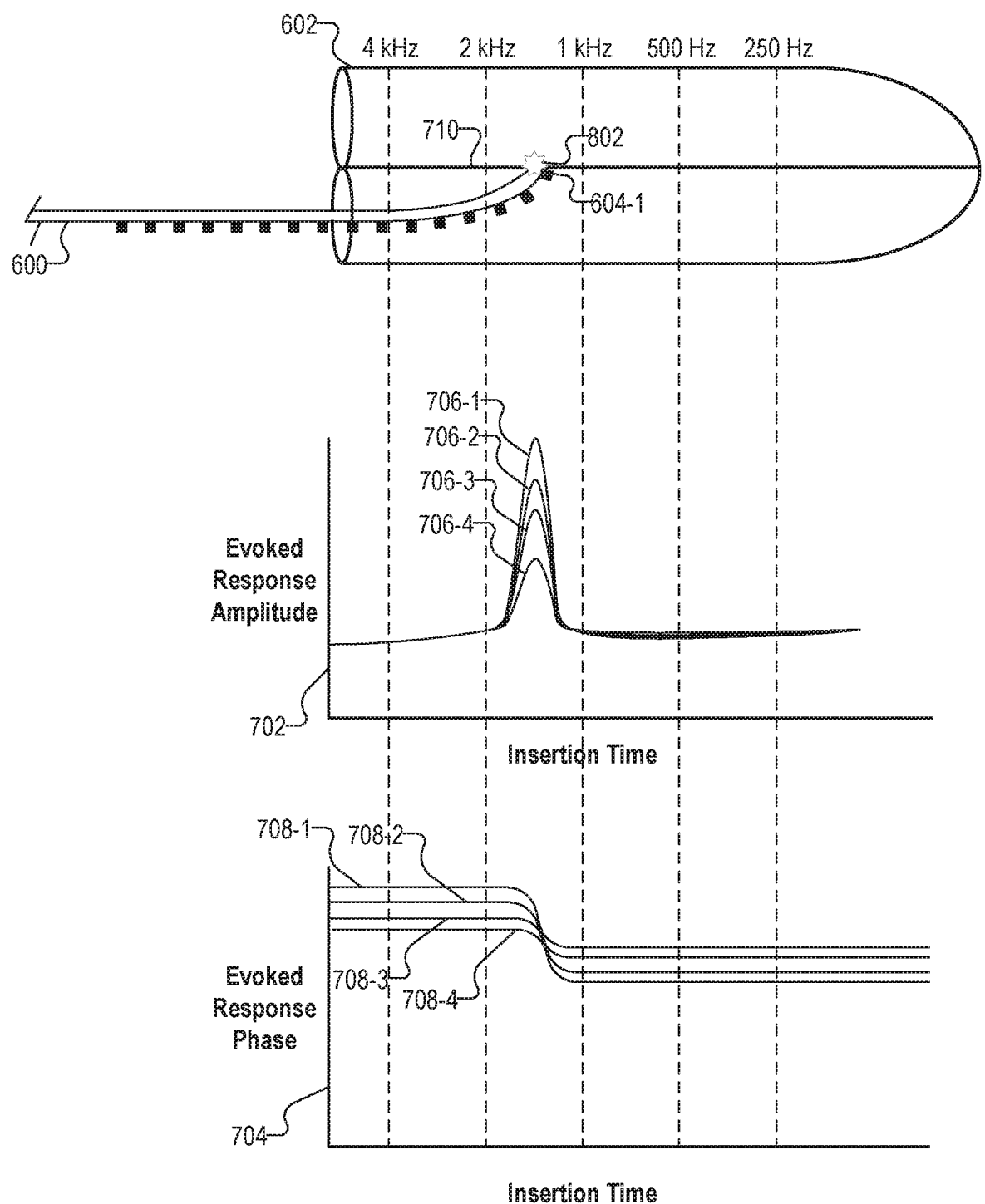

To illustrate, FIG. 8 shows an exemplary electrode lead insertion procedure in which electrode lead 600 is advanced into cochlea 602. FIG. 8 also shows graph 702 of amplitudes 706 (e.g., amplitudes 706-1 through 706-4) of evoked response signals recorded by electrode 604-1 during the lead insertion procedure. In addition, FIG. 8 shows graph 704 of phases 708 (e.g., phases 708-1 through 708-4) of the evoked response signals recorded by electrode 604-1 during the lead insertion procedure. In this example, first, second, third, and fourth evoked response signals are generated in response to acoustic stimulation having stimulus frequencies of 2 kHz, 1 kHz, 500 Hz, and 250 Hz, respectively.

As shown in FIG. 8, electrode lead 600 has come into contact with basilar membrane 710 at a position 802 along the length of basilar membrane 710. Hence, as shown in graph 702, amplitudes 706 of each of the first, second, third, and fourth evoked response signals increase and peak as a result of electrode lead 600 contacting basilar membrane 710 at position 802. In addition, as shown in graph 704, phase 708 of each of the first, second, third, and fourth evoked response signals change from a relatively high level to a relatively low level as a result of electrode lead 600 contacting basilar membrane 710 at position 802.

As shown in FIG. 8, the decreasing of the first, second, third, and fourth evoked response amplitudes 706 and the changing of each of phases 708 from the high level to the low level occur at substantially the same time (e.g., within a predetermined time period), and each occur as electrode lead 600 contacts basilar membrane 710 and changes mechanical stiffness of basilar membrane 710. Hence, diagnostic system 300 may determine that electrode lead 600 contacts a structure such as basilar membrane 710 by determining, within a predetermined time period, that the amplitudes of each of the evoked response signals included in the plurality of evoked response signals have decreased by at least the amplitude threshold amount and the phases of each of the evoked response signals have changed by at least the phase threshold amount. The predetermined time period, the amplitude threshold amount, and/or the phase threshold amount may each be set by diagnostic system 300 to be any suitable value, such as described herein.

In certain examples, diagnostic system 300 may be configured to determine a location and/or an amount of contact with respect to the structure of cochlea 602 based on amplitudes and phases of each of the evoked response signals. The location of the contact may be determined in any suitable manner. In addition, the amount of contact may be determined in any suitable manner. For example, amplitudes 706 of each of he first, second, third, and fourth evoked response signals shown in FIG. 8 may be indicative of a first amount of contact with respect to basilar membrane 710 at position 802. Relatively larger amplitudes 706 of each of the first, second, third, and fourth evoked response signals may be indicative of a second amount of contact with respect to basilar membrane 710 at position 802 that is relatively greater than the first amount of contact. Additionally or alternatively, an amount of phase change may be indicative of an amount of contact with respect to basilar membrane 710 at position 802, For example, the amount of phase change shown in FIG. 8 may be indicative of electrode lead 600 contacting basilar membrane 710 at a first amount of contact. The amount of phase change may increase with greater contact and/or in response to electrode lead 600 translocating basilar membrane 710.

In certain examples, an insertion state of an electrode lead may be associated with an electrode lead passing a cluster of a particular type of cells (e.g., hair cells, neuron cells, etc.) within the cochlea. In such examples, diagnostic system 300 may determine that an electrode lead passes a cluster of a particular type of cells such as hair cells when amplitudes of one or more evoked response signals included in the plurality of evoked response signals have decreased by at least an amplitude threshold amount and phases of the one or more evoked response signals have not changed by at least a phase threshold amount. For example, diagnostic system 300 may determine that the electrode lead passes a cluster of hair cells when the amplitudes of the second, third, and fourth evoked response signals decrease by at least an amplitude threshold amount and the phases of the second, third, and fourth evoked response signals do not change by at least a phase threshold amount.

Figure 9:
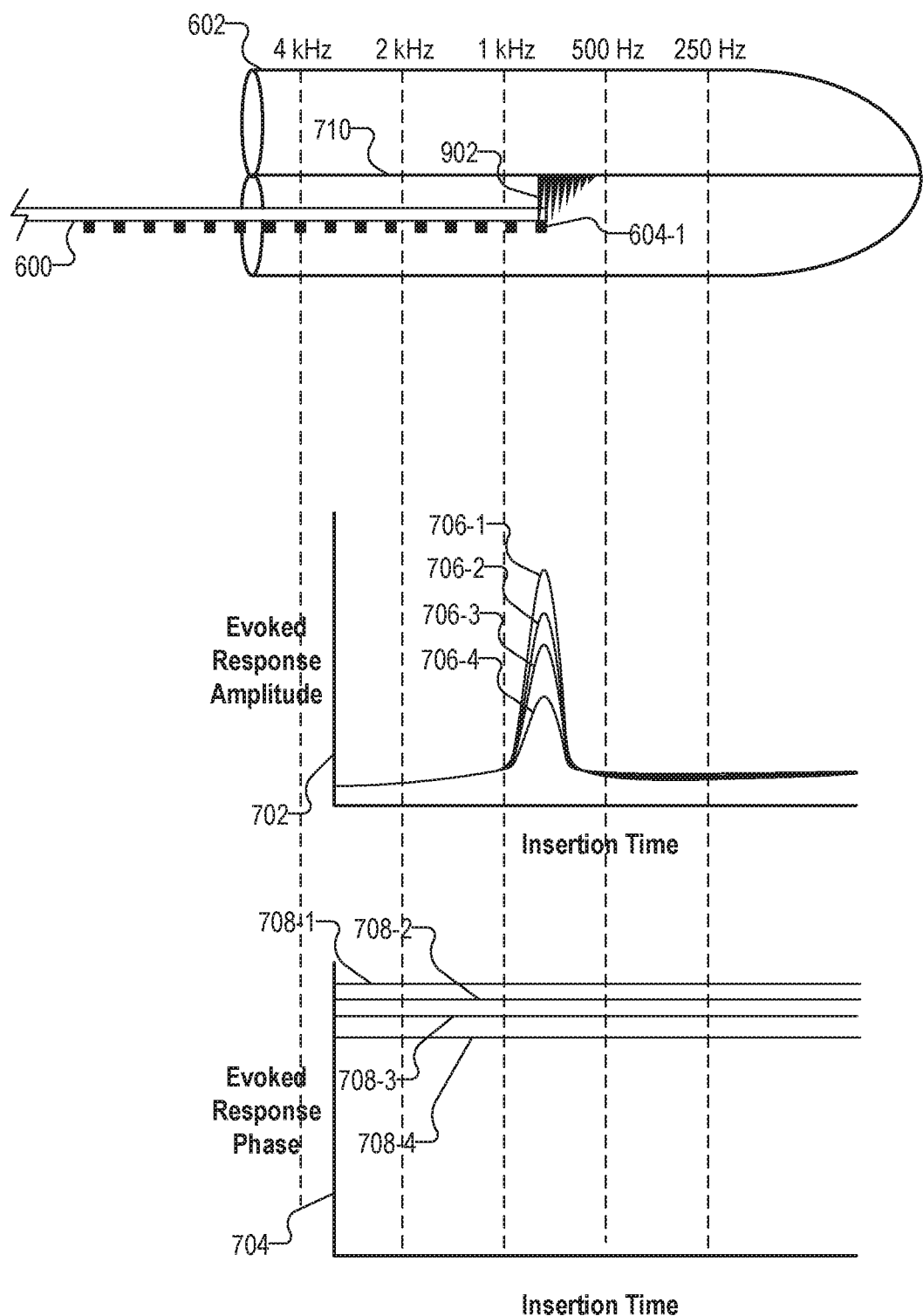

In certain alternative examples, diagnostic system 300 may determine that an electrode lead passes a cluster of a particular type of cells such as hair cells when amplitudes of each of the evoked response signals included in the plurality of evoked response signals have decreased by at least an amplitude threshold amount and phases of each of the evoked response signals have not changed by at least a phase threshold amount. To illustrate an example, FIG. 9 shows an exemplary electrode lead insertion procedure in which electrode lead 600 is advanced into cochlea 602. FIG. 9 also shows graph 702 of amplitudes 706 (e.g., amplitudes 706-1 through 706-4) of evoked response signals recorded by electrode 604-1 during the lead insertion procedure. In addition, FIG. 9 shows graph 704 of phases 708 (e.g., phases 708-1 through 708-4) of the evoked response signals recorded by electrode 604-1 during the lead insertion procedure. In this example, first, second, third, and fourth evoked response signals are generated in response to acoustic stimulation having stimulus frequencies of 2 kHz, 1 kHz, 500 Hz, and 250 Hz, respectively.

As shown in FIG. 9, electrode lead 600 passes a cluster of hair cells 902 along the length of cochlea 602. As a result of passing cluster of hair cells 902, an amplitude 706 of each of first, second, third, and fourth evoked response signals has peaked and dropped at an insertion time associated with passing cluster of hair cells 902. However, as shown in graph 704, phases 708 of each of the first, second, third, and fourth evoked response signals have not changed by at least a phase threshold amount as a result of passing cluster of hair cells 902. Hence, diagnostic system 300 may determine that electrode lead 600 passes cluster of hair cells 902 when, within a predetermined time period, amplitudes of one or more evoked response signals included in the plurality of evoked response signals have decreased by at least an amplitude threshold amount and that phases of the one or more evoked response signals have not changed by at least a phase threshold amount.

In certain examples, an insertion state of an electrode lead may be associated with a possible occurrence of trauma (e.g., translocation from the scala tympani to the scala vestibuli (i.e., by penetrating through the basilar membrane)) to a structure of a cochlea of a recipient. Such trauma may be caused by the electrode lead penetrating the basilar membrane of the cochlea, inadvertently being placed within a wrong duct of the cochlea, and/or in any other suitable manner. In such examples, diagnostic system 300 may determine that the electrode lead has caused trauma to the cochlea based on a determination that amplitudes of evoked response signals included in a plurality of evoked response signals have decreased by at least an amplitude threshold amount and phases of the evoked response signals have changed by at least a phase threshold amount that is relatively larger than an additional phase threshold amount indicative of the electrode lead merely contacting a structure of the cochlea. In this regard, diagnostic system 300 may use different phase threshold amounts to determine different insertion states of electrode lead 600 in certain implementations.

Figure 10:
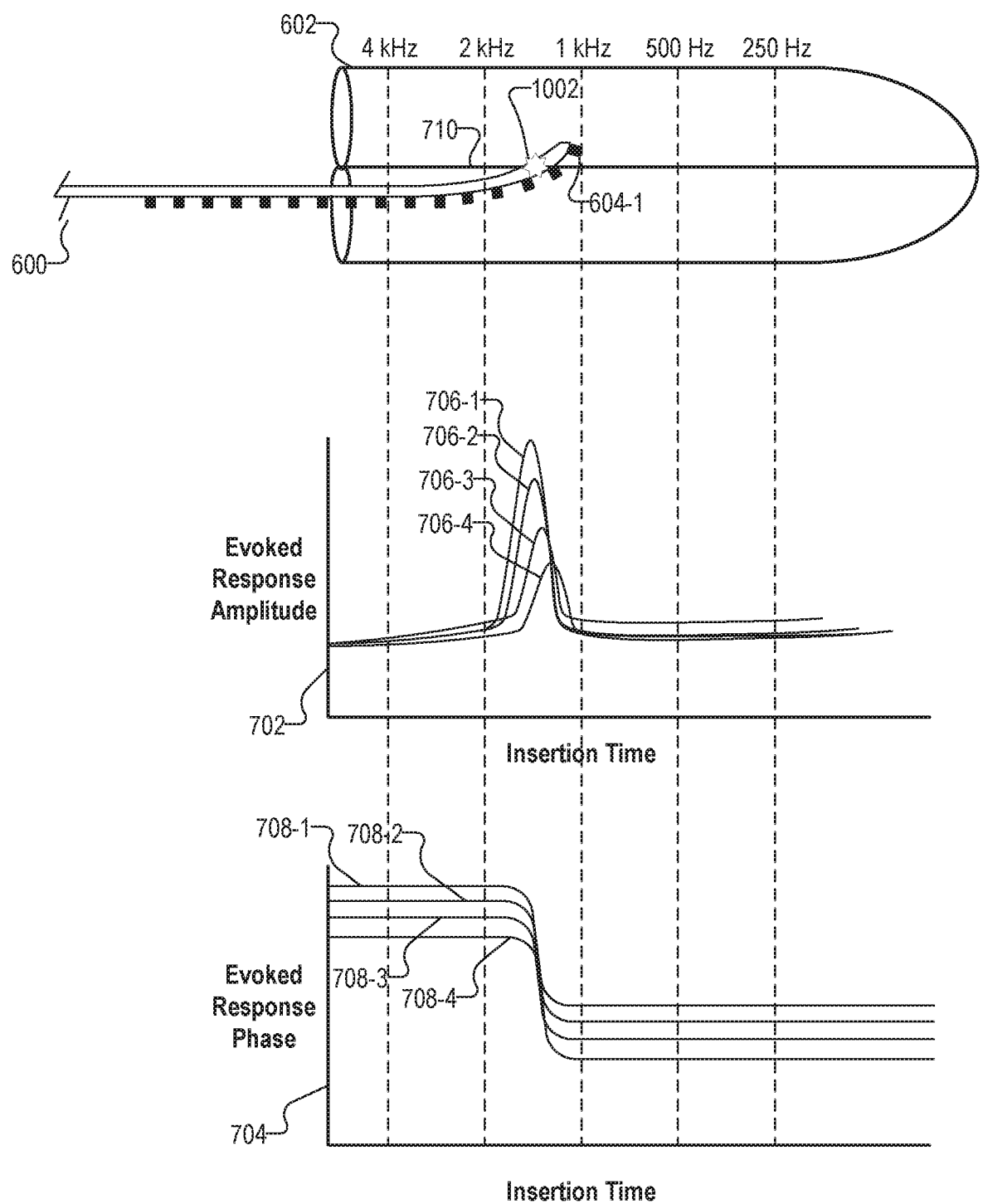

To illustrate, FIG. 10 shows an exemplary electrode lead insertion procedure in which electrode lead 600 is advanced into cochlea 602. FIG. 10 also shows graph 702 of amplitudes 706 (e.g., amplitudes 706-1 through 706-4) of evoked response signals recorded by electrode 604-1 during the lead insertion procedure. In addition, FIG. 10 shows graph 704 of phases 708 (e.g., phases 708-1 through 708-4) of the evoked response signals recorded by electrode 604-1 during the lead insertion procedure. In this example, first, second, third, and fourth evoked response signals are generated in response to acoustic stimulation having stimulus frequencies of 2 kHz, 1 kHz, 500 Hz, and 250 Hz, respectively.

As shown in FIG. 10, electrode lead 600 has come into contact with and has punctured basilar membrane 710 at a position 1002 along the length of basilar membrane 710. Hence, as shown in graph 702, amplitudes 706 of each of the first, second, third, and fourth evoked response signals increase and peak decrease by at least an amplitude threshold amount with respect to each other as a result of electrode lead 600 puncturing basilar membrane 710 at position 1002. As shown in graph 704, phase 708 of each of the first, second, third, and fourth evoked response signals change from a relatively high level to a relatively low level as a result of electrode lead 600 puncturing basilar membrane 710. The amount of phase change shown in FIG. 10 is relatively larger than the amount of phase change shown in FIG. 8. This is because there is a relatively higher phase change threshold associated with electrode lead 600 causing trauma to cochlea 602 as compared to electrode lead 600 merely contacting basilar membrane 710, as shown in FIG. 8.

As shown in FIG. 10, the decreasing of the first, second, third, and fourth evoked response amplitudes 706 by at least the amplitude threshold amount and the changing of each of phases 708 from the high level to the low level occur at substantially the same time, and each occur as electrode 604-1 punctures basilar membrane 710. Hence, diagnostic system 300 may determine that electrode 604-1 has caused trauma to cochlea 602 based on diagnostic system 300 determining, within a predetermined time period, that the amplitudes of the evoked response signals included in the plurality of evoked response signals have decreased by at least the amplitude threshold amount and the phases of the evoked response signals changing have changed by at least a phase threshold amount that is relatively larger than an additional phase threshold amount indicative of the electrode lead contacting a structure of the cochlea, The phase threshold amount associated with causing trauma to cochlea 602 may be set by diagnostic system 300 to be any suitable value, such as described herein.

In certain examples, evoked response amplitudes (e.g., evoked response amplitudes 706) decreasing by different amounts with respect to each other may additionally or alternatively be indicative of an electrode lead causing trauma to the cochlea. Any suitable amount difference in the decrease of the amplitudes of the evoked response signals may be indicative of trauma to the cochlea.

In certain examples, diagnostic system 300 may be configured to provide a notification regarding an insertion state while an electrode lead is inserted into a cochlea. Such a notification may be provided in any suitable manner. For example, diagnostic system 300 may be configured to provide an audible notification, a text notification, and/or a graphical notification configured to inform a user (e.g., a surgeon) of the insertion state. In certain examples, the notification may include providing a graph of the evoked response signals for display in one or more graphs displayed by way of a display device (e.g., display device 408) associated with diagnostic system 300. For example, diagnostic system 300 may direct a display device to display a graph of the evoked response signals in substantially real time as an insertion procedure is being performed by displaying each evoked response signal included in the plurality of evoked response signals such that, at any given time, multiple evoked response signals included in the plurality of evoked response signals are concurrently displayed by the display device. By displaying one or more graphs of the evoked response signals recorded by an electrode during the insertion procedure, diagnostic system 300 may provide real-time feedback to a user (e.g., a surgeon) performing the insertion procedure. This feedback may be used by the user to ensure proper placement of the electrode lead 600 within cochlea 602 and/or for any other purpose as may serve a particular implementation.

To illustrate, in the exemplary insertion procedure shown in FIG. 10, system 300 may be configured to provide a textual notification in a graphical user interface on a display screen to indicate that electrode lead 600 has punctured basilar membrane 710.

In response to seeing such a notification appear within the graphical user interface, a user may stop the insertion procedure and/or take other remedial action (e.g., by pulling back the electrode lead outside the cochlea, changing electrode insertion angle, etc.). Any other type of notification (e.g., audible or visible notification) may additionally or alternatively be presented to the user as may serve a particular implementation.

In certain examples, diagnostic system 300 may direct a display device to display a first graph representative of the amplitudes of the evoked response signals and a second graph representative of the phases of the evoked response signals. For example, diagnostic system 300 may direct a display device to display graph 702 as a first graph and graph 704 as a second graph shown, for example, in FIG. 10 in any suitable manner. In certain examples, diagnostic system 300 may direct a display device to concurrently display graphs 702 and 704 in a single graphical user interface.

Additionally or alternatively, a single graphical user interface that displays graphs 702 and 704 may also display a graphical representation of cochlea 602 and a graphical representation of electrode lead 600 being inserted within cochlea 602 during the insertion procedure similar to what is shown, for example, in FIG. 8. In such examples, the graphical representation of electrode lead 600 may be animated to facilitate depicting electrode lead 600 being inserted in real time into cochlea 602. In addition, such a graphical representation of electrode lead 600 be animated to depict certain insertion states. For example, the graphical representation of electrode lead may be depicted as contacting a wall of cochlea 602 if diagnostic system 300 determines that an insertion state corresponding to contact of electrode lead 600 with a structure of cochlea 602 occurs.

Figure 11:
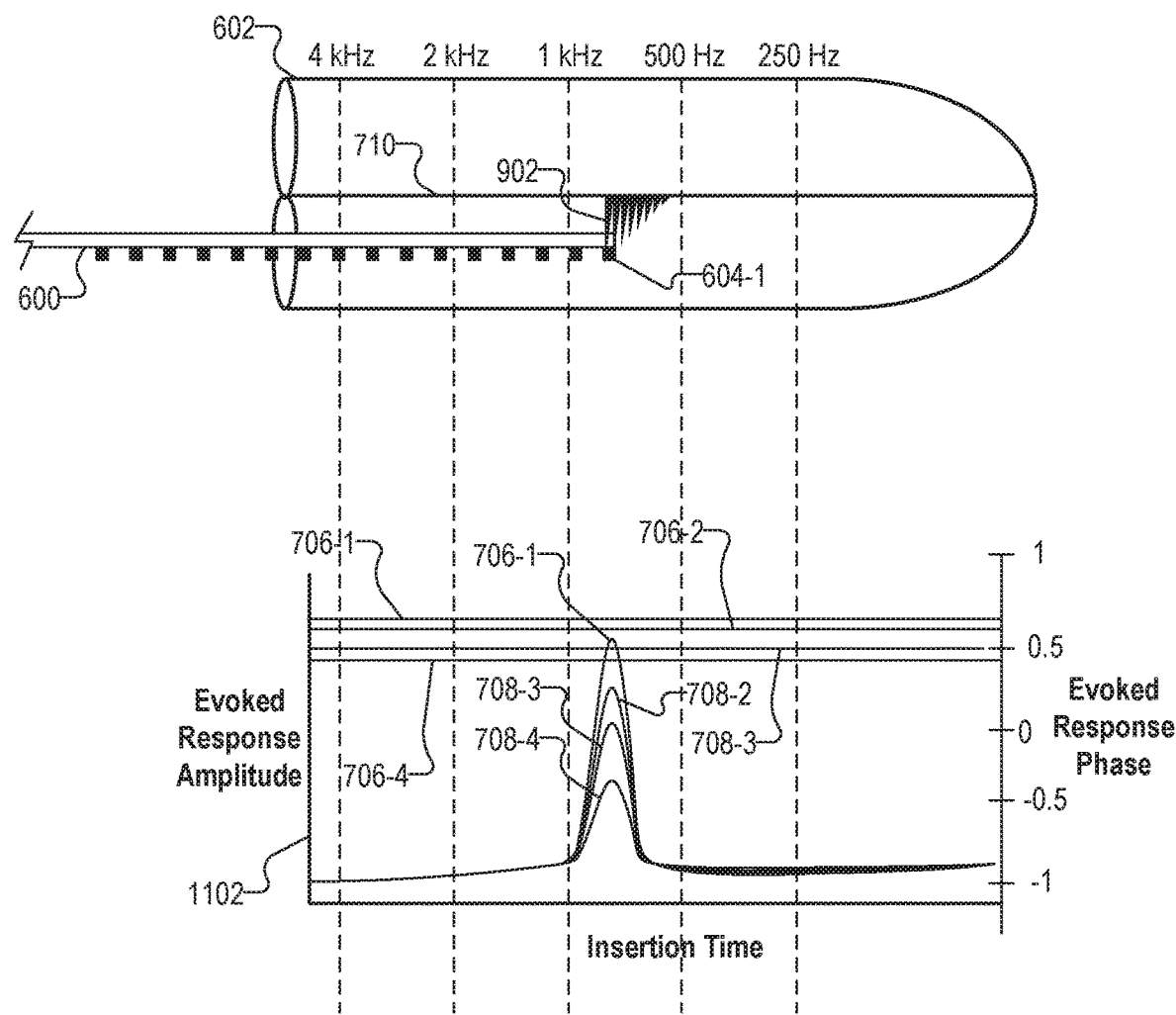

In certain alternative implementations, diagnostic system 300 may direct a display device to display amplitudes and phases of evoked response signals for display in a single graph. To illustrate, FIG. 11 shows an alternative implementation in which a single graph 1102 includes both amplitudes 706 and phases 708 of first, second, third, and fourth evoked response signals that may be generated in response to an insertion procedure in which electrode lead 600 passes cluster of hairs 902. Graph 1102 may be provided for display to a user in any suitable graphical user interface to facilitate the user performing an insertion procedure.

Figure 12:
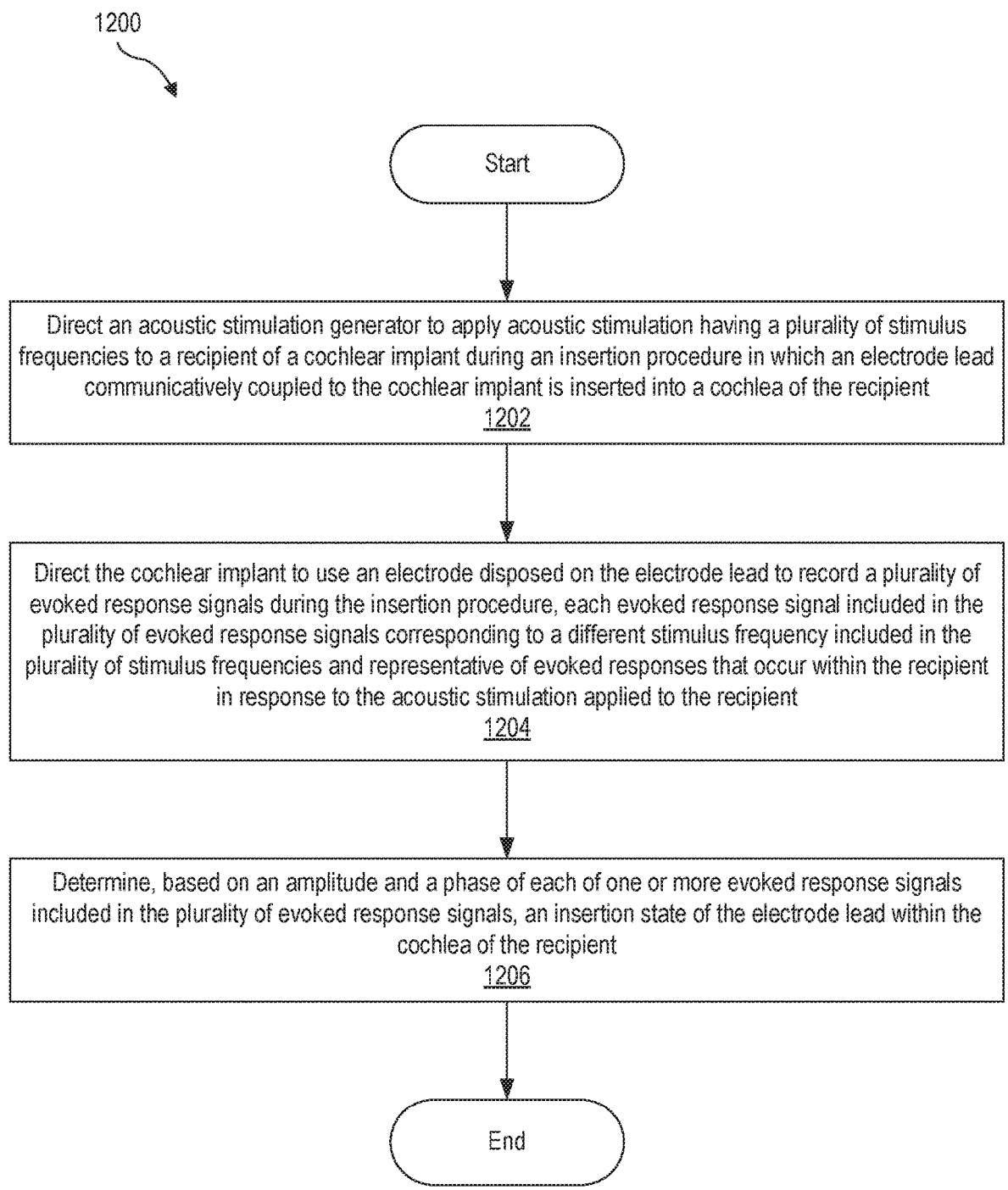
FIG. 12 illustrates an exemplary method according to principles described herein.

FIG. 12 illustrates an exemplary method 1200. The operations shown in FIG. 12 may be performed by diagnostic system 300 and/or any implementation thereof. While FIG. 12 illustrates exemplary operations according to one embodiment, other embodiments may omit, add to, reorder, and/or modify any of the operations shown in FIG. 12.

In operation 1202, a diagnostic system directs an acoustic stimulation generator to apply acoustic stimulation having a plurality of stimulus frequencies to a recipient of a cochlear implant during an insertion procedure in which an electrode lead communicatively coupled to the cochlear implant is inserted into a cochlea of the recipient. Operation 1202 may be performed in any of the ways described herein, In operation 1204, the diagnostic system directs the cochlear implant to use an electrode disposed on the electrode lead to record a plurality of evoked response signals during the insertion procedure, each evoked response signal included in the plurality of evoked response signals corresponding to a different stimulus frequency included in the plurality of stimulus frequencies and representative of evoked responses that occur within the recipient in response to the acoustic stimulation applied to the recipient. Operation 1204 may be performed in any of the ways described herein.

In operation 1206, the diagnostic system determines, based on an amplitude and a phase of each of one or more evoked response signals included in the plurality of evoked response signals, an insertion state of the electrode lead within the cochlea of the recipient. Operation 1206 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 13:
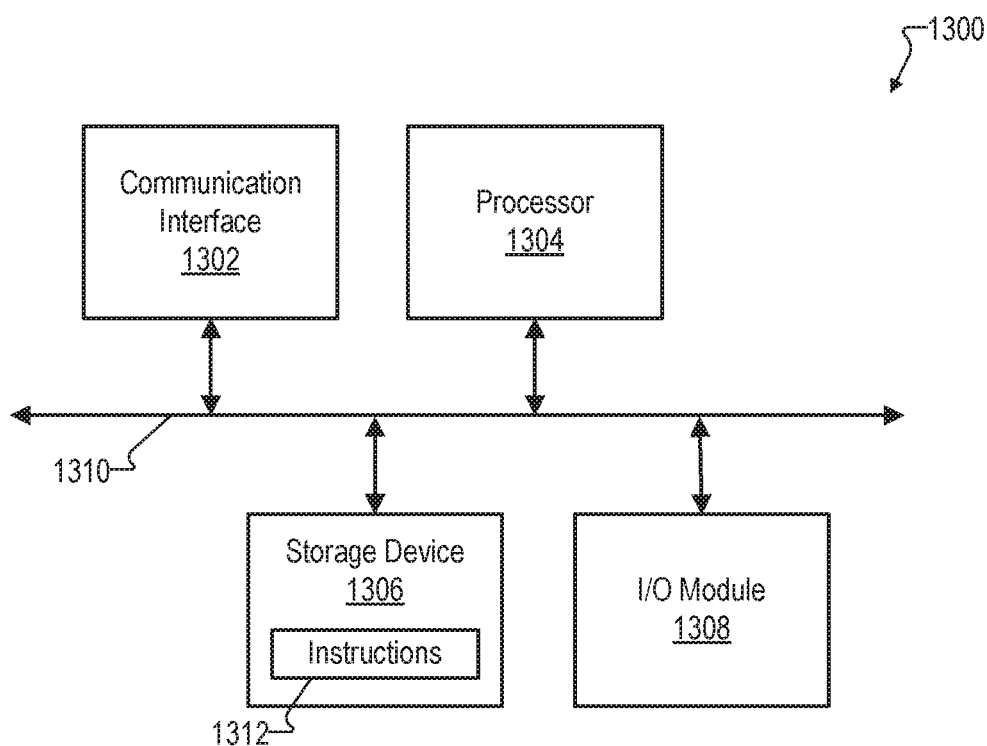
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected one to another via a communication infrastructure 1310. While an exemplary computing device 1300 is shown in FIG. 13, the components illustrated in FIG. 13 are not intended to be limiting. Additional or alternative components may be used in other embodiments, Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data and/or interpreting, executing, and/or directing execution of one or more of the instructions, processes, and/or operations described herein.

Processor 1304 may perform operations by executing computer-executable instructions 1312 (e.g., an application, software, code, and/or other executable data instance) stored in storage device 1306.

Storage device 1306 may include one or more data storage media, devices, or configurations and may employ any type, form, and combination of data storage media and/or device. For example, storage device 1306 may include, but is not limited to, any combination of the non-volatile media and/or volatile media described herein. Electronic data, including data described herein, may be temporarily and/or permanently stored in storage device 1306. For example, data representative of computer-executable instructions 1312 configured to direct processor 1304 to perform any of the operations described herein may be stored within storage device 1306. In some examples, data may be arranged in one or more databases residing within storage device 1306, I/O module 1308 may include one or more I/O modules configured to receive user input and provide user output. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1300. For example, storage facility 302 may be implemented by storage device 1306, and processing facility 304 may be implemented by processor 1304.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a memory storing instructions; and
a processor communicatively coupled to the memory and configured to execute the instructions to:
direct an acoustic stimulation generator to apply acoustic stimulation having a plurality of stimulus frequencies to a recipient of a cochlear implant during an insertion procedure in which an electrode lead communicatively coupled to the cochlear implant is inserted into a cochlea of the recipient, wherein stimulus frequencies included in the plurality of stimulus frequencies are concurrently applied to the recipient;
direct the cochlear implant to use an electrode disposed on the electrode lead to record a plurality of evoked response signals during the insertion procedure, each evoked response signal included in the plurality of evoked response signals corresponding to a different stimulus frequency included in the plurality of stimulus frequencies and representative of evoked responses that occur within the recipient in response to the acoustic stimulation applied to the recipient; and
determine, based on an amplitude and a phase of each of one or more evoked response signals included in the plurality of evoked response signals, an insertion state of the electrode lead within the cochlea of the recipient.

2. The system of claim 1, wherein the processor is further configured to execute the instructions to:
determine, within a predetermined time period, that both an amplitude of a particular evoked response signal included in the plurality of evoked response signals decreases by at least an amplitude threshold amount and a phase of the particular evoked response signal changes by at least a phase threshold amount;
wherein the determining of the insertion state comprises determining, based on the determining that the amplitude of the particular evoked response signal decreases by at least the amplitude threshold amount and the phase of the particular evoked response signal changes by at least the phase threshold amount, that the electrode passes a characteristic frequency location in the cochlea, the characteristic frequency location corresponding to a particular stimulus frequency that corresponds to the particular evoked response signal and that is included in the plurality of stimulus frequencies.

3. The system of claim 2, wherein the determining that the electrode passes the characteristic frequency is further based on at least one of
an amplitude of an additional evoked response signal included in the plurality of evoked response signals not decreasing by at least the amplitude threshold amount; or
a phase of the additional evoked response signal not changing by at least the phase threshold amount.

4. The system of claim 2, wherein the processor is further configured to execute the instructions to:
determine, within an additional predetermined time period, that both an amplitude of an additional particular evoked response signal included in the plurality of evoked response signals decreases by at least an amplitude threshold amount and a phase of the additional particular evoked response signal changes by at least a phase threshold amount;
wherein the determining of the insertion state further comprises determining, after the electrode passes the characteristic frequency location and based on the determining that the amplitude of the additional particular evoked response signal decreases by at least the amplitude threshold amount and the phase of the additional particular evoked response signal changes by at least the phase threshold amount, that the electrode passes an additional characteristic frequency location in the cochlea, the additional characteristic frequency location corresponding to an additional particular stimulation frequency that corresponds to the additional particular evoked response signal and that is included in the plurality of stimulus frequencies.

5. The system of claim 1, wherein the processor is further configured to execute the instructions to:
determine, within a predetermined time period, that amplitudes of one or more evoked response signals included in the plurality of evoked response signals have decreased by at least an amplitude threshold amount and that phases of the one or more evoked response signals have not changed by at least a phase threshold amount;
wherein the determining of the insertion state comprises determining, based on the determining that the amplitudes of the one or more evoked response signals included in the plurality of evoked response signals have decreased by at least the amplitude threshold amount and that the phases of the one or more evoked response signals have not changed by at least the phase threshold amount, that the electrode passes a cluster of hair cells within the cochlea.

6. The system of claim 1, wherein the processor is further configured to execute the instructions to:
determine, within a predetermined time period, that amplitudes of at least two of the evoked response signals included in the plurality of evoked response signals have decreased by at least an amplitude threshold amount and that phases of the at least two of the evoked response signals have changed by at least a phase threshold amount;
wherein the determining of the insertion state comprises determining, based on the determining that the amplitudes the at least two of the evoked response signals included in the plurality of evoked response signals have decreased by at least the amplitude threshold amount and the phases of the at least two of the evoked response signals have changed by at least the phase threshold amount, that the electrode lead is in contact with a structure of the cochlea.

7. The system of claim 6, wherein the determining of the insertion state further comprises determining at least one of a location or an amount of contact with respect to the structure of the cochlea based on the amplitudes and the phases of the at least two evoked response signals.

8. The system of claim 6, wherein the structure of the cochlea is a basilar membrane of the cochlea.

9. The system of claim 1, wherein the processor is further configured to execute the instructions to:
determine, within a predetermined time period, that amplitudes of the evoked response signals included in the plurality of evoked response signals have decreased by at least an amplitude threshold amount and phases of the evoked response signals have changed by at least a phase threshold amount that is relatively larger than an additional phase threshold amount indicative of the electrode lead contacting a structure of the cochlea;

wherein the determining of the insertion state comprises determining, based on the determining that the amplitudes of the evoked response signals included in the plurality of evoked response signals have decreased by the at least the amplitude threshold amount and the phases of the evoked response signals have changed by at least the phase threshold amount, that the electrode lead has translocated the structure and caused trauma to the cochlea.

10. The system of claim 1, wherein the processor is further configured to execute the instructions to provide a notification regarding the insertion state while the electrode lead is inserted into the cochlea of the recipient.

11. The system of claim 1, wherein the processor is further configured to execute the instructions to direct a display device to display a graph of the evoked response signals in substantially real time as the insertion procedure is being performed by displaying the evoked response signals such that, at any given time, multiple evoked response signals included in the plurality of evoked response signals are concurrently displayed by the display device.

12. The system of claim 11, wherein the directing of the display device to display the graph of the evoked response signals comprises directing the display device to display the amplitudes and the phases of the evoked response signals for display in a single graph.

13. The system of claim 11, wherein the directing of the display device to display the graph of the evoked response signals comprises directing the display device to display:
   a first graph representative of the amplitudes of the evoked response signals; and
   a second graph representative of the phases of the evoked response signals.

14. The system of claim 1, wherein the electrode is a distal-most electrode disposed on the electrode lead.

15. A method comprising:
   directing, by a diagnostic system, an acoustic stimulation generator to apply acoustic stimulation having a plurality of stimulus frequencies to a recipient of a cochlear implant during an insertion procedure in which an electrode lead communicatively coupled to the cochlear implant is inserted into a cochlea of the recipient, wherein stimulus frequencies included in the plurality of stimulus frequencies are concurrently applied to the recipient;
   directing, by the diagnostic system, the cochlear implant to use an electrode disposed on the electrode lead to record a plurality of evoked response signals during the insertion procedure, each evoked response signal included in the plurality of evoked response signals corresponding to a different stimulus frequency included in the plurality of stimulus frequencies and representative of evoked responses that occur within the recipient in response to the acoustic stimulation applied to the recipient; and
   determining, by the diagnostic system based on an amplitude and a phase of each of one or more evoked response signals included in the plurality of evoked response signals, an insertion state of the electrode lead within the cochlea of the recipient.

16. The method of claim 15, further comprising providing, by the diagnostic system, a notification regarding the insertion state while the cochlear implant is inserted into the cochlea of the recipient.

17. The method of claim 15, further comprising directing, by the diagnostic system, a display device to display a graph of the evoked response signals in substantially real time as the insertion procedure is being performed by displaying the evoked response signals such that, at any given time, multiple evoked response signals included in the plurality of evoked response signals are concurrently displayed by the display device.

18. The method of claim 17, wherein the directing of the display device to display the graph of the evoked response signals comprises directing the display device to display the amplitudes and the phases of the evoked response signals for display in a single graph.

19. The method of claim 17, wherein the directing of the display device to display the graph of the evoked response signals comprises directing the display device to display:
   a first graph representative of the amplitudes of the evoked response signals; and
   a second graph representative of the phases of the evoked response signals.

20. A non-transitory computer readable storage medium storing instructions that, when executed, direct a processor to:
   direct an acoustic stimulation generator to apply acoustic stimulation having a plurality of stimulus frequencies to a recipient of a cochlear implant during an insertion procedure in which an electrode lead communicatively coupled to the cochlear implant is inserted into a cochlea of the recipient, wherein stimulus frequencies included in the plurality of stimulus frequencies are concurrently applied to the recipient;
   direct the cochlear implant to use an electrode disposed on the electrode lead to record a plurality of evoked response signals during the insertion procedure, each evoked response signal included in the plurality of evoked response signals corresponding to a different stimulus frequency included in the plurality of stimulus frequencies and representative of evoked responses that occur within the recipient in response to the acoustic stimulation applied to the recipient; and
   determine based on an amplitude and a phase of each of one or more evoked response signals included in the plurality of evoked response signals, an insertion state of the electrode lead within the cochlea of the recipient.

* * * * *